US008660915B2

(12) United States Patent
Giacobbe et al.

(10) Patent No.: US 8,660,915 B2
(45) Date of Patent: Feb. 25, 2014

(54) MANAGING AN INVENTORY OF SERVICE PARTS

(75) Inventors: Robert A. Giacobbe, Tucker, GA (US); R. Douglas Derrick, Atlanta, GA (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/550,372

(22) Filed: Jul. 16, 2012

(65) Prior Publication Data

US 2012/0323744 A1 Dec. 20, 2012

Related U.S. Application Data

(62) Division of application No. 10/862,935, filed on Jun. 8, 2004, now Pat. No. 8,224,717.

(60) Provisional application No. 60/577,547, filed on Jun. 7, 2004.

(51) Int. Cl.
*G06Q 10/00* (2012.01)

(52) U.S. Cl.
USPC .............................................. 705/28; 705/10

(58) Field of Classification Search
USPC .......................................................... 705/28
See application file for complete search history.

(56) References Cited

U.S. PATENT DOCUMENTS

| | | | |
|---|---|---|---|
| 5,946,662 A | 8/1999 | Ettl et al. | |
| 6,078,900 A * | 6/2000 | Ettl et al. | .......... 705/28 |
| 6,606,744 B1 | 8/2003 | Mikurak | |
| 6,671,818 B1 | 12/2003 | Mikurak | |
| 7,072,843 B2 * | 7/2006 | Menninger et al. | .......... 705/7.31 |
| 7,124,101 B1 | 10/2006 | Mikurak | |
| 7,130,807 B1 | 10/2006 | Mikurak | |
| 7,249,068 B1 * | 7/2007 | Kakouros et al. | ............... 705/28 |
| 7,257,552 B1 | 8/2007 | Franco | |
| 7,300,287 B2 | 11/2007 | Dowdell et al. | |
| 7,324,966 B2 | 1/2008 | Scheer | |
| 7,957,991 B2 | 6/2011 | Mikurak | |
| 2001/0047293 A1 * | 11/2001 | Waller et al. | ............... 705/10 |
| 2002/0072956 A1 | 6/2002 | Willems et al. | |
| 2003/0046193 A1 | 3/2003 | Aschick et al. | |
| 2004/0073507 A1 | 4/2004 | Scott et al. | |
| 2005/0114235 A1 | 5/2005 | Snyder et al. | |

OTHER PUBLICATIONS

ProQuest Info & Learning "Cornell Hotel & Restaurant Administration Quarterly" v34n3 pp. 90-95 Jun. 1993.

* cited by examiner

*Primary Examiner* — Garcia Ade
(74) *Attorney, Agent, or Firm* — Finnegan, Henderson, Farabow, Garrett & Dunner, LLP

(57) ABSTRACT

An inventory of service parts may be managed by assessing a company's capability, optimizing the inventory and implementing a management program based on the assessment and optimization. Optimizing target stock levels for the inventory of parts may be accomplished by calculating an inventory baseline for understanding information about the currently held inventory; developing a service strategy for a set of segments; quantifying a service level for each of the segments; analyzing the segments and their service levels for identifying at least one logistically distinct business; assigning each of the segments to a "best-fit" planning model for indicating each segment's deployment, replenishment, forecasting and review characteristics; identifying a probability distribution function for estimating a demand process of each of the segments; and calculating a target stock level for each segment.

20 Claims, 8 Drawing Sheets

MANAGING AN INVENTORY OF SERVICE PARTS

RELATED APPLICATION

This application is a division of U.S. application Ser. No. 10/862,935, filed Jun. 8, 2004, titled "MANAGING AN INVENTORY OF SERVICE PARTS," which is incorporated herein by reference, and which claims the benefit of U.S. Provisional Application No. 60/577,547, filed Jun. 7, 2004, titled "MANAGING AN INVENTORY OF SERVICE PARTS," which is incorporated herein by reference.

BACKGROUND OF THE INVENTION

This invention relates to inventory systems and specifically to planning and deploying inventory systems for service parts used to service and repair equipment.

Many companies regard post-sale servicing of their products as little more than a distraction. From this perspective, service is only an expense. However, analysis shows that post-sales service can be a significant revenue generator when properly planned and managed. For example, in the highly competitive jet engine business, manufacturers have realized that the value of servicing a product over its life can exceed the original sales price by as much as five times.

The tasks faced by post-sales business groups vary greatly by industry and by customer type. Personal computer manufacturers may have a large client base but only a relatively small number of parts to keep on hand to service perhaps 30 models of PCs. In contrast, manufacturers of construction or land moving equipment may have a smaller client base but may need to service such a wide range of complicated machinery that perhaps 500,000 replacement service parts need to be available to the repair technicians. Tracking and planning for the half million parts is a very challenging task.

Unfortunately, those managing the inventory may not be well qualified. For example, certain OEMs allow their dealers to control part inventories. The planners at these dealerships may treat all parts equally, applying the same forecasting, stocking, lot sizing and reviewing policies—regardless of the demand, supply and profit characteristics of the individual parts. For example, planners may make no distinction between an item with a high-volume demand, stable order patterns and quick replenishment lead times, and another item that rarely fails in the field, is sourced from one supplier and has a six-month lead time. As a result, these dealers may keep excess inventory aging on shelves while lacking the specific parts needed by their service technicians.

In an attempt at a solution, some post-sales business units have implemented software to help their inventory management needs. However, current transactional and advanced planning software fails to identify and integrate the detailed root causes of inventory performance. For example, demand for service parts typically exhibits random, or stochastic demand patterns; this uncertainty must be included in developing deployment and replenishment strategies. Also, enterprise resource planning systems currently available may help OEMs to meet only 40%-60% of their high-volume post-sales needs. This leaves a 60%-40% gap that has been difficult to fix.

What is needed is a way to close the gap between the inventory of service parts and the need for the parts. What is needed is a method to prioritize the management of a parts inventory to optimize the process, thereby having the proper mix of inventory to meet agreed upon service levels without overstocking on inventory. What is also needed is a way to perform such management without requiring planners to have an advanced degree in statistics or operations research. What is needed is a methodology that is cost-effective as well as scientifically based rather than only being based on rules of thumb or 'guestimates'. What is needed is a way to determine the drivers of inventory levels for service parts and to control these drivers. In addition, what is needed is a systematic and easy-to-understand methodology and toolset for that will allow the average user to conduct advanced optimization techniques on their service parts inventories.

There are several other factors and issues typically associated with managing service parts inventories. First, supplier performance for service parts is typically very poor; replenishment lead times typically range from 6-18 months, and line fill rates typically are less than 50%. Next, service parts distribution networks are typically fragmented with lots of individual locations: central depots, field depots, customer depots, and mobile stock. The large number of forward deployed inventories makes inventory visibility difficult, thereby making it very difficult to develop and implement stable deployment and replenishment strategies. Next, many service parts are also considered repairables, which are parts that can be fixed when they fail, instead of disposed. Repair operations require reverse flows (from customer to repair depots), forecasting of repairs, and disposition decisions, all which further add complexity to managing service parts.

BRIEF SUMMARY OF THE INVENTION

In one aspect of the present invention, there is a method for optimizing target stock levels for the inventory of parts, such as those used by asset operators and equipment manufacturers to service their equipment. Under this method, a service strategy may be developed for a set of segments and a service level may be quantified for each segment. The segments and their service levels may be analyzed for identifying at least one logistically distinct business. Each of the segments may be assigned to a "best-fit" planning model for indicating each segment's deployment, replenishment, forecasting and review characteristics. A probability distribution function may be identified for estimating a demand process of each of the segments. In one embodiment, identifying the probability distribution function may include calculating a target stock level for each of the segments. Such target stock levels may be calculated to likely meeting a service level at a desired cost objective.

DETAILED DESCRIPTION OF THE INVENTION

1. Calculating the Baseline Inventory

Figure 1:
FIG. 1 is a flowchart of one embodiment of the invention divided into five steps.

FIG. 1 shows a flowchart of a general steps in one embodiment of the invention, which includes calculating the current baseline inventory, developing a strategy and a series of segments, assigning each segment to a planning model, matching the demand for service parts with a distribution function and then calculating optimized target stock levels.

The present invention's process may begin by calculating an inventory baseline 110 for understanding information about the currently held inventory. While gathering this baseline is known in the art and there are various techniques that can be used, some of representative tasks are to gather initial inventory data, build the inventory baseline model and validate, modify/customize data requests to operating environment, determine data sampling strategy, identify data sources within the IT infrastructure, and submit detailed data requests.

A goal of the inventory baseline is to understand the present inventory: such as by answering what is on-hand, where is it, what are its characteristics and how well is it currently operating. While it is not technically difficult to generate the baseline, it can be a difficult task to handle. In many industries, service parts are not tracked once they are distributed to the repair technicians. In such a case, the inventory of service parts may be considered an operating expense. Thus, once perhaps 30 to 50 percent of the inventory is sent ahead to satellite depots or to individual technicians, that inventory becomes invisible and outside of the equation.

Since tracking down the inventory piece by piece may be unduly challenging, software may be used to create statistically valid samples of the inventory to approximate the inventory baseline. This can create a representation of the inventory while minimizing collection time and effort. In some environments, one may extract transactional data from each network echelon and location to model the entire supply chain. To generate the sample, a planner may determine the total parts population to be sampled and then determine if a sampling strategy is needed (since sometimes analyzing the entire parts population may not be too difficult). If a sample is needed, then the planner may create a statistically valid sample from the population and identify randomized stock keeping units ("SKUs") to be in the sample. Then data for those SKUs may be extracted from various data sources and the statistical analysis performed.

Figure 2:
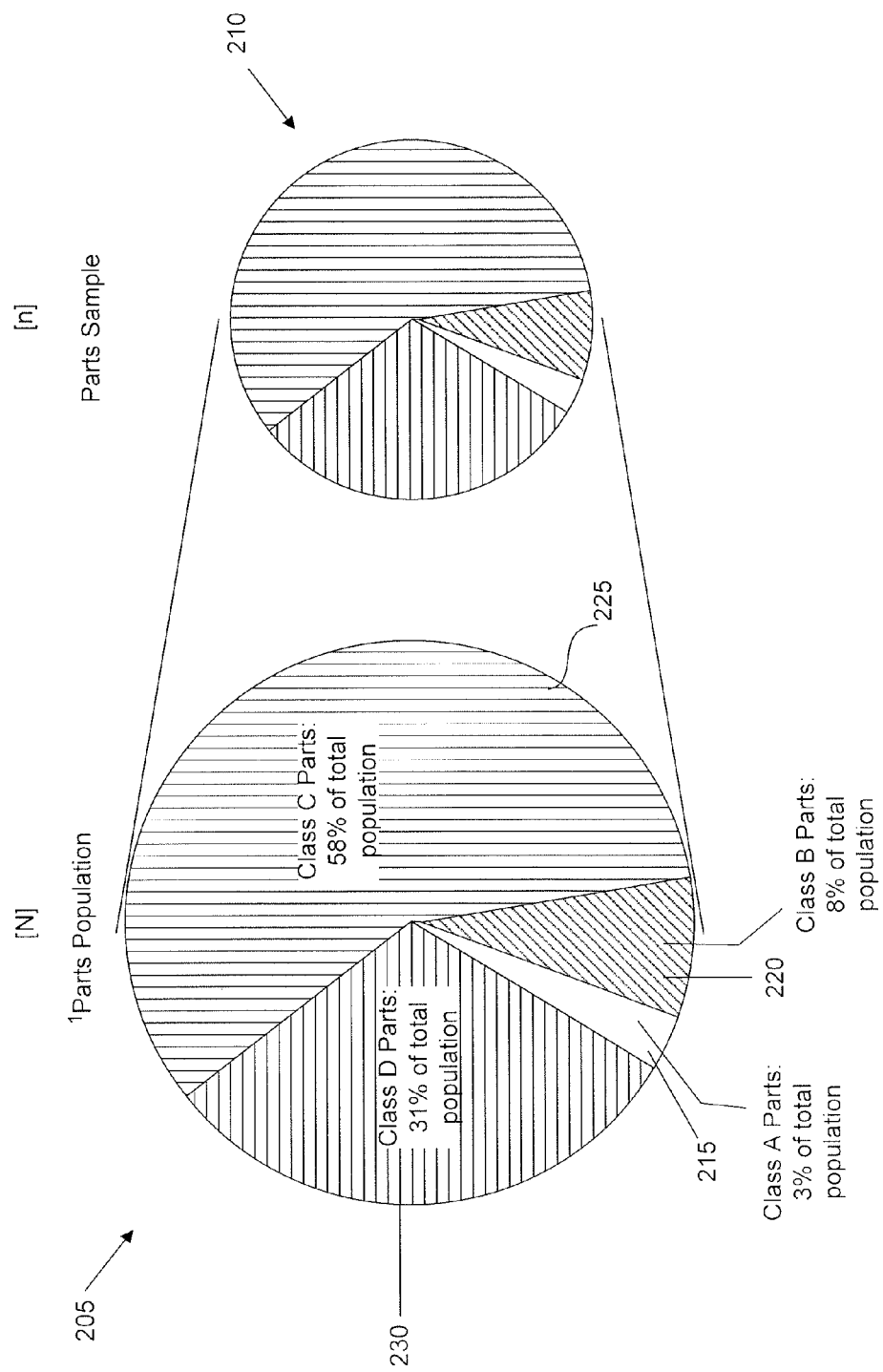
FIG. 2 illustrates how sampling may represent an ABCD population.
Figure 3:
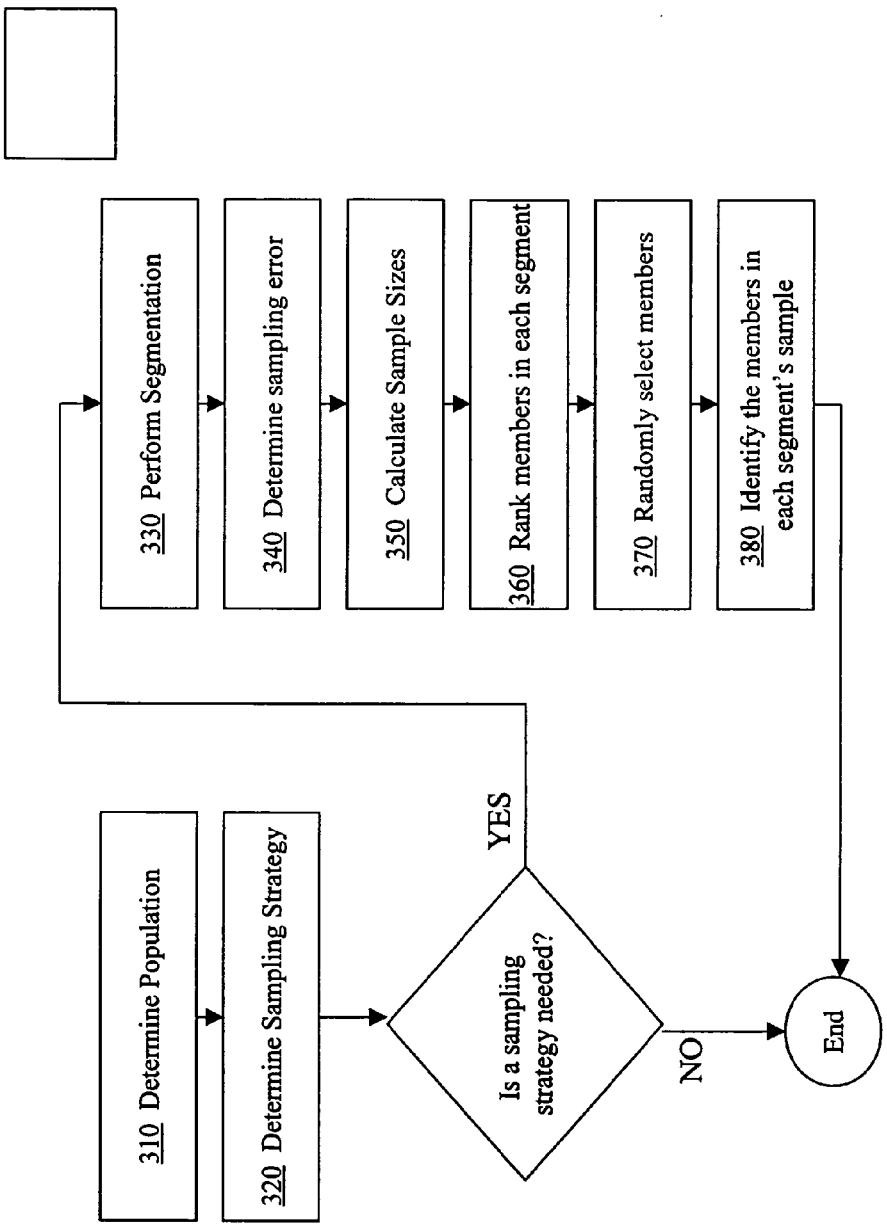
FIG. 3 is a flowchart of the one embodiment of the invention's sampling methodology.

FIGS. 2 and 3 illustrate one novel way to create a proper sample. This approach reflects design decisions made about the present invention's optimization approach. FIG. 2 shows a parts population as a pie chart 205 that can be represented by sample 210. In FIG. 2, the parts population is segmented into four classes A through D. Such a classification may be referred to as ABCD. In such a classification, the parts assigned to class A make up 80% of cumulative dollar volume for a company 215, class B has parts representing the parts such that class A and B make up 95% of cumulative dollar volume 220. Similarly, class C includes the parts such that classes A, B and C make up 100% of cumulative dollar value 225. Class D may include those parts that make up 0% dollar volume 230.

One skilled in the art will recognize that the parts population may be divided in various ways without departing from the scope of the present invention. For example, some in the art commonly divide populations into three classes, known as ABC. One might also divide the classes based on a criteria other than collar volume. Thus various numbers of classes and various class criteria may be chosen. Regardless of how the classifications are chosen, a sample 210 may statistically represent the profile of the parts in the population 205.

One may use various methods to generate the sample. FIG. 3 illustrates one approach that may be used in one embodiment of the present invention. While FIG. 3 assumes that the population and sample have four segments, namely A, B, C and D, one skilled in the art will recognize that the method may be used for other segmentations.

At step 310, the total population of the parts to be included [N] may be determined. The scope of the analysis may be defined at this point, such as the number of locations or echelons, the number of internal vs. external sites, active vs. inactive parts, etc. At this point, one may choose to distinguish SKUs from raw product numbers.

At step 320, whether or not a sampling strategy is needed is determined. This decision may be driven by the analysis tool to be used. For example, Excel may only process approximately 65,000 records while a database tool may process many more than that number. If the population [N] is small enough, sampling may not be needed.

If a sampling strategy is not needed (step 324), then the entire parts population [N] may be modeled or analyzed without the use of a sample population. Otherwise, the process of FIG. 3 may continue in order to generate a statistically valid and randomized sample (326). At step 330, ABCD unit volume segmentation may be conducted on the entire parts population to determine the population count for each category, $N_A$, $N_B$, $N_C$ and $N_D$. Such segmentation may have already been done. Or, if necessary, the category populations may be estimated by applying percentages to the overall [N].

At step 340, the sampling error, or level of precision to be used in the analysis [e] may be determined. In some circumstances, the sampling error chosen may be 90% (0.10) or 95% (0.05). Of course, other sampling errors may be used. In the analysis, [e] may be the probability measure that states how much the sample characteristics) such as the mean and standard deviation, for example) may deviate from the population if [N] had been analyzed instead of [n].

At step 350, the sample sizes for each of the segments are calculated. For example, ABCD segments would have ($n_A$, $n_B$, $n_C$ and $n_D$). One way to calculate these sample sizes is with the formula:

$$n_x = N_x / 1 + N_x(e)^2$$

where e may be 0.05, 0.10 or another preferred value and where x represents a segment, such as A, B, C, or D as discussed above. Thus, if four segments are used, then the formula is applied four times to derive a sample size for each of the segments. One skilled in the art will be aware that this formula is a simplified version of more advanced sampling techniques and that other formulas may also be used.

At step 360, the product numbers in each segment are sorted or ranked based on some chosen criterion measure. For example, unit cost and item name are two possible criteria. Once the product numbers are sorted, then each part number may be assigned its ranking number. For example, the first product number in segment A may be assigned to 1. If this is not feasible to system limitations or otherwise, then steps 360, 370 and 380 may be skipped.

At step 370, a random number generator is used to randomly select the parts to include in the sample from each segment. For example, if Excel is being used as the sampling tool, then the formula "=RANDBETWEEN(1, 333)" may be used to generate the random numbers (where the current segment has 333 elements, for example). If using Excel, one may wish to use the Excel Analysis Toolpak add-in. The quantity of random numbers needed to be generate matches the values of $n_A$, $n_B$, $n_C$ and $n_D$.

At step 380, the randomly selected parts are identified and their data is extracted. For example, if $N_A$ is 2,000 and $n_A$ is 333, then one may generate 333 random numbers between 1 and 2,000. Then one may match those random numbers against the sorted, numbered A items. These may then become the sampled parts for that category.

As another way to minimize the effort of calculating the baseline, the present invention offers a statistical analysis tool with data requests preconfigured for different environments. For example, data requests for wholesale distribution, retail aftermarket, airline MRO, telecomm maintenance, high-tech spares, dealer channels, public utility/energy, military logistics, fixed asset maintenance and plant operations may all be installed. The invention contains data requests that collect the data in a method that facilitates the optimization approach in the invention.

At the end of the baseline inventory procedure, some of the deliverables may be the inventory baseline model, completed data request templates, and a data sampling and management strategy.

2. Developing a Strategy and Defining Segments

Developing a service strategy 120 for a plurality of segments is another step of the present invention. While it is shown in FIG. 1 after step 110, actually it may be done before, during or after that step. Broadly speaking, this step involves viewing the parts inventory from a top-down view and understand a strategy for what kinds of service levels the company wants to offer to its customers. One of goals of this step is to select a segmentation criteria that is based on business requirements and that may create meaningful and unique segments that can be analyzed for operational insights.

Two examples of segmentation criteria are a supply-focused segmentation and a demand-focused segmentation. In a supply-focused segmentation approach, the chosen segments may be based on criteria such as: supplier lead time variation and duration, supplier delivery performance, standard cost of part, replenishment frequency, economic lot size, supplier relationship type, and part lifecycle phase. In contrast, in a demand-focused segmentation, the segments may be based on: criticality of customer demand, degree of demand perishability, part profitability or contribution margin, economic importance of customer, strategic importance of customer, demand variability, and interrelation with other segment businesses.

Figure 4:
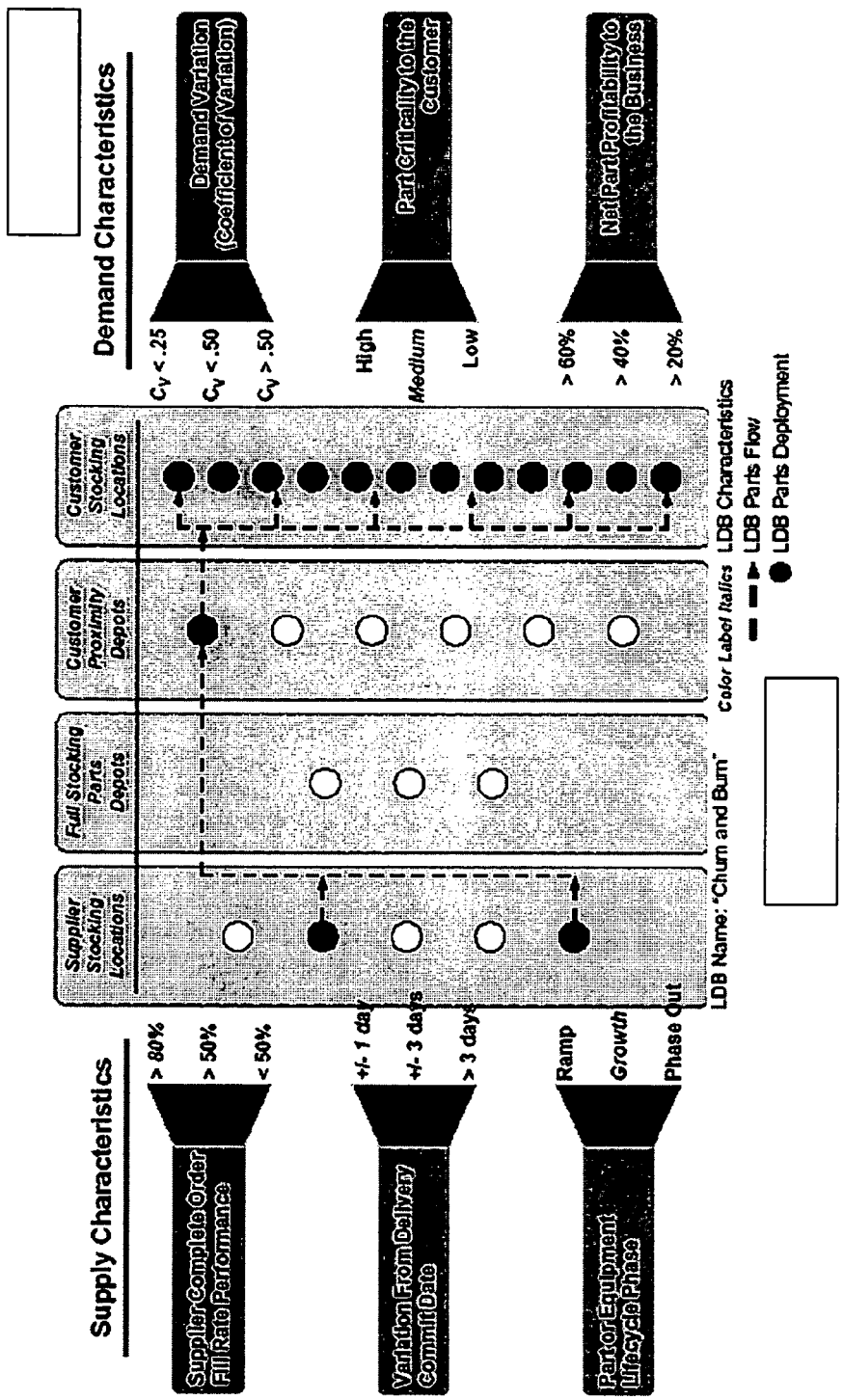
FIG. 4 is an illustration of pipelines identifying a logistically distinct business.

Results from segmentation may be used to find "pipelines" within the customer's business to understand how to manage a segment in a more focused manner. FIG. 4 shows one example of pipelines and how logistically distinct businesses ("LDBs") may be identified within the broader parts supply chain. In a complex supply chain that is tightly managed, there may only be a single LDB. Other supply chains may indicate the presence of more than one LDB. In FIG. 4, a "churn and burn" LDB is indicated.

LDBs are critical to structure the customer service strategy of a service business for three reasons. First, construction of LDBs allows the business to identify the unique physical flows that exist in any distribution network. For example, the LDB modeling may demonstrate that a specific grouping of customers also exhibit a specific ordering profile, such that they are driving the majority of the logistics activity in the network. Second, LDB's also allow the business to identify the unique service and supply chain requirements associated with that LDB. For example, LDB modeling will identify the lead time, fill rate, packaging, delivery, etc. requirements that are associated with a logical grouping of customers. Last, LDBs are important because they determine the value component associated with a logical grouping of customers and parts. For example, LDB modeling may show that a group of customers drive the majority of sales, are the least profitable accounts, have the highest service requirements, but are also strategically important to the business and therefore require new selling and operating capabilities to manage.

Segmentation may also be described from different viewpoints. For example, high-level customer segmentation models may be built. Part segmentation models may able be constructed. For other companies, it may make sense to identify the service levels by channel, customer grouping, SKU, etc.

Once the segments are identified, a planner may use empirical data to quantify a service level for each of the segments. Assigning the service level attempts to balance the cost of holding or carrying the inventory for the segment against the cost of a stock-out in which a needed service part must be ordered. Service levels may be defined implicitly or explicitly. With the implicit method, one uses a calculation to imply the optimum service level as a function of stock-out costs and carrying costs. Such an implicit service level may be a best-fit if the values for the input parameters to the function are available, if the business has not existing customer service strategy, or if the business does not understand cost-to-serve concepts. When the service level is implicitly determined, the planning planner considers costs and service to determine the optimum balance for a customer or LDB. Presently, most companies use the implicit method.

The explicit service level approach uses management expertise to set the acceptable minimum number of planned stock-outs. While in the past a company's sales force may have instructed the parts inventory planner to maintain perhaps a 98% fill rate, there was no tie back to the company in terms of cost. The explicit service level approaches provide such information.

Such an explicit approach may be valid if the business management is capable of assigning discrete, differentiated service levels to customers. Three such explicit levels are: cycle service level, fill rate level, and ready rate level. In the cycle service level measure, a specified probability of no stock-outs per replenishment cycle is calculated. This is generally known as an availability measure and can include the probability of periods having zero demand. This cycle service level may be a best fit with numerous periods of zero demand.

The fill rate service level is a specific fraction of demand to be satisfied routinely from the shelf. This is the most common measure and assumes no backorders or lost sales. It may be a best fit for higher-volume parts or for distribution systems where replenishment lead times are fixed or very costly to change.

The ready rate service level is a specific fraction of time during which net stock is positive. It may be the least common measure, but has application in emergency environments. It is complex to use to determine optimal inventory policy, but may be applicable for end-of-life products.

One embodiment of the present invention combines these approaches and may leverage the implicit method for critical and high-value items while using one of the explicit methods for less-critical or less profitable parts.

3. Assigning Planning Models

Figure 5:
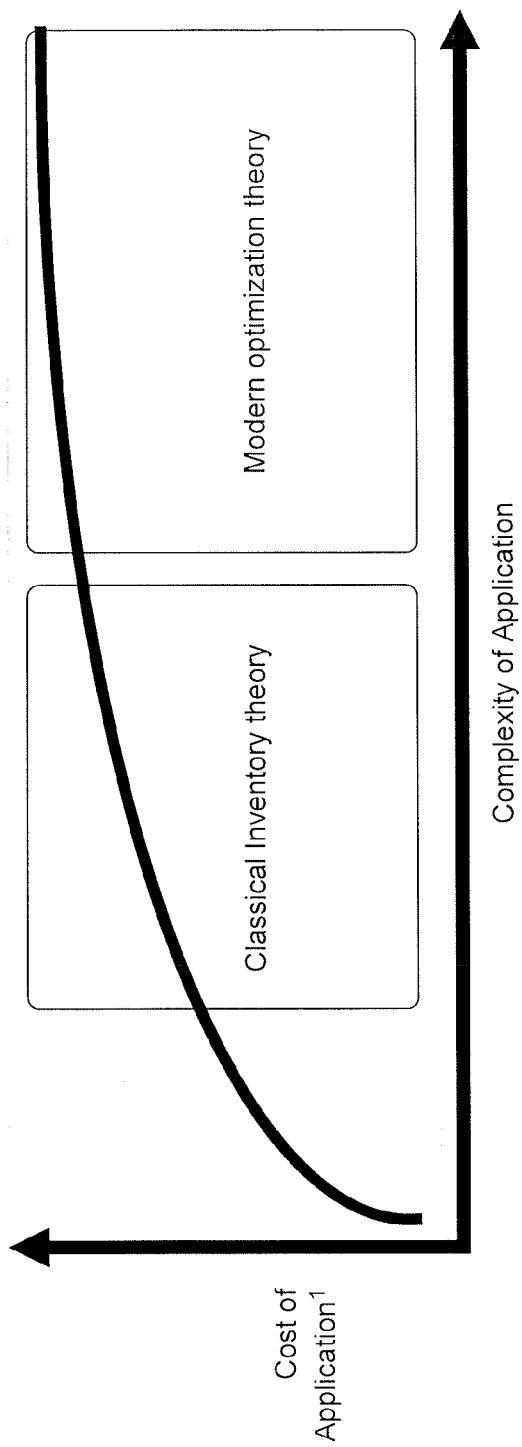
FIG. 5 is a diagram of a planning model continuum.

Referring again to FIG. 1, the next step may be to assign each of the segments to a "best-fit" planning model 130, which is a decision driven by the requirements and rules that define each segmentation class. Such a planning model describes the deployment, replenishment, forecasting and review parameters for the segment. FIG. 5 is a diagram of a planning model continuum that illustrates the variation in the planning models from the most basic (on the left) to the most advanced approaches (on the right).

This continuum indicates that rather than attempting to offer the highest level of service for all parts, one can be more surgical by choosing plans along the continuum that best fit each segment. For example, for low churn items, having the deployment plan be a rule of thumb (such as a time-based criteria with 10 days coverage), may be adequate since reordering can be done quickly. Thus, a replenishment strategy for such a plan may be to order every 5 days. Forecasting may be accomplished using historical sales (with a weighted moving average). The review strategy may be for the planners to review such rules of thumb once a quarter.

At the right end of the spectrum of FIG. 5, some segments may need a complex plan. While the cost of this type of plan may be greater, it may be justified due to the critical nature of the parts, the high profitability of the parts, etc. This type of planning model has been supported by commercially available software since around the year 2000. Some of the many vendors offering software to support such complex plans are: SAP, Servigistics, Finmatica, i2, Manugistics, MCA Solutions, Baxter Planning Systems, and Xelus.

One of the goals of this step of choosing a best-fit planning model for each segment is to focus planners on what is important rather than having them try to manage all service parts equally. Planners may now spend the proper time and effort on the proper segments for an optimized planning approach for deployment, replenishment, forecasting and review.

4. Determining a Probability Distribution Function

Once the best-fit planning model is assigned, the fourth step in the process may be to identify a probability distribution function ("PDF") 140. In this step, one may use a range of statistical tests to identify (i.e., "fit") the demand process to the most likely probability distribution that represents the demand. This can be a difficult mathematical procedure, but generally one may collect demand data and then find the probability distribution function that underlies the part and model that function to gain insight from it.

As one would expect, if demand is normally distributed (such as a bell curve), then managing the stock for a part is generally easy. Unfortunately, part demand is not always normally distributed. Prior part systems for inventory management did one of two things. The first type of prior part systems skipped this step of determining the distribution. Rather than understand the complex function describing the distribution, a planner calculated target stock levels for the service parts using rules of thumb or other rough approaches.

The second type of prior part systems used a back door approach to attempt to generate a number associated with the probability distribution function. In such prior part techniques, one used historical demand data for the services parts and used that data to simulate the stocking locations. The simulation would be run to find the first pass fill rate ("FPFR"). Once the FPFR was known, one would run the simulation again on an iterative basis, slowly (and clumsily) backing into the number hopefully associated with the distribution function. This technique was used without understanding the function itself. Such systems had many disadvantages. In addition to not revealing a probability distribution for the demand, distributions with probabilistic functions, stochastic functions or randomized functions were generally missed. By directly calculating the probability distribution function, the present invention overcomes the shortcomings of such prior art systems.

Another prime disadvantage of using this back door approach is that it is not repeatable or consistent. For example, if this trial-by-error method is used and the optimum stocking level is determined, it is most likely by random chance; the dynamic nature of service parts supply and demand will make this same result impossible to recreate in the next planning cycle. Likewise, if the back door approach is used and over- or under-service conditions results, there is no ability to determine a root cause of the event because there was no formality in determining it in the first place.

Figure 6:
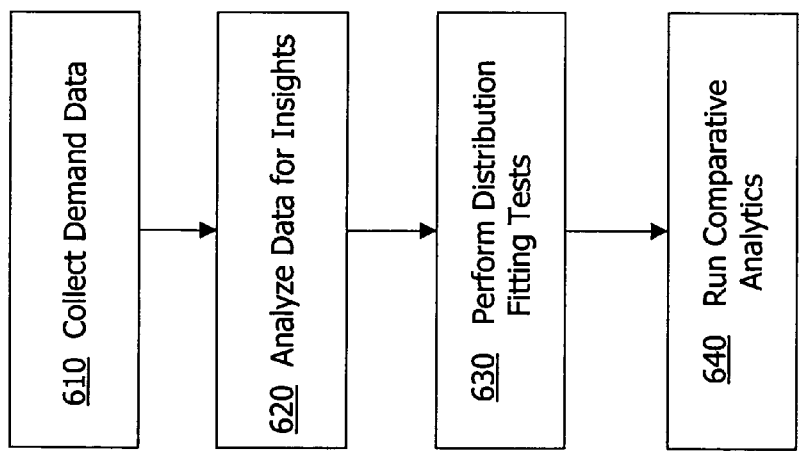
FIG. 6 shows one approach to calculating the distribution function as contemplated by the present invention.

FIG. 6 shows one approach to calculating the distribution function as contemplated by the present invention. First, a planner may collect demand data 610. Preferably, data is collected for a part segment or LDB to represent multiple, similar SKUs. In one embodiment, monthly demand data for one to three years may be collected. To minimize the data needs, a manageable set of candidate demand processes may be selected and used as proxies across other, similar demand processes.

Second, the data may be analyzed for insights 620. Histograms may be generated to visualize the shape and skewness of the distribution. The data may also be analyzed for autocorrelation errors and independence may be assessed.

Third, distribution fitting tests may be performed on the data 630. In this step, statistical software may be used to perform fitness tests. In one embodiment of the present invention, 22 predefined probability distributions may be compared with the fitness tests. Such tests may generate a relative score (out of 100, for example) based on the distribution parameters.

Fourth, comparative analytics may be run to select the distribution function 640. Graphical overlays between the histogram and the probability density function may be performed. Fitness tests (such as the Chi Square test, the Kolmogorov-Smirnov test, and the Anderson-Darling test) may be run against specific probability distribution functions. Based on the results of these and other tests, the final distribution may be chosen for use in the deployment algorithm. While the tests involved in FIG. 6 are well known in the art, such traditional planning approaches for service parts fail because they apply a standard distribution to a non-normally distributed part. The present invention overcomes this deficiency.

Figure 7:
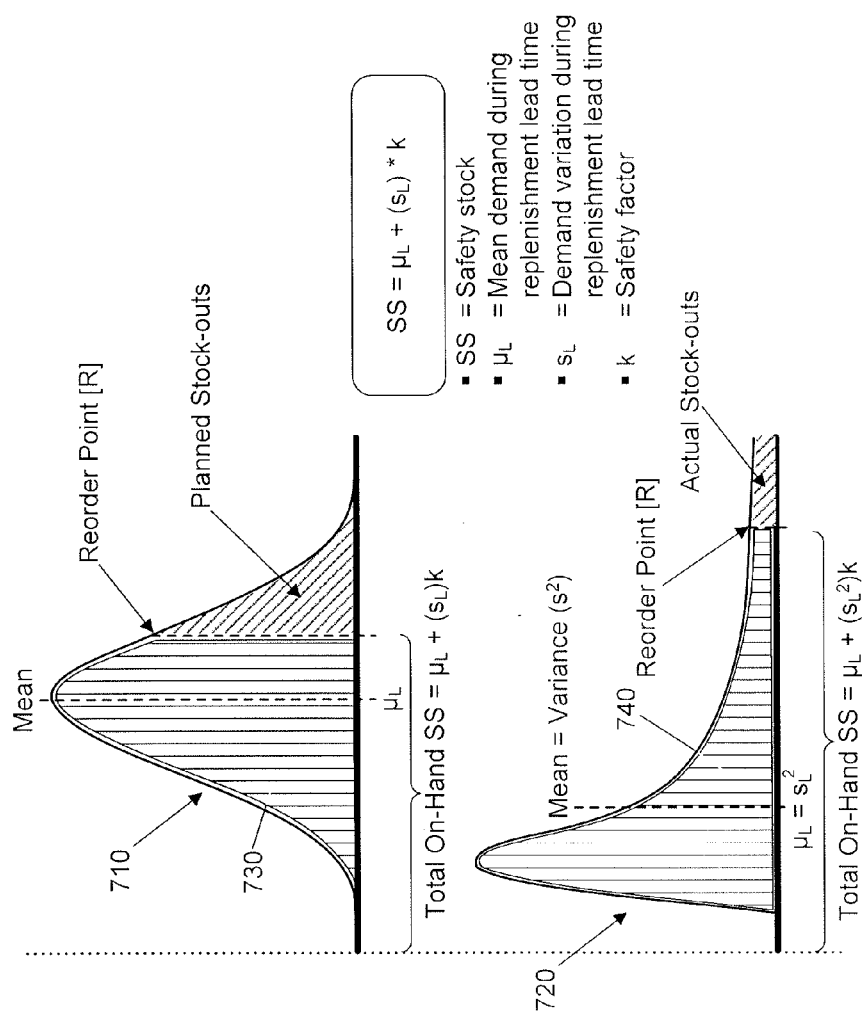
FIG. 7 demonstrates how distribution functions may offer insight.

Using the present invention's method for step 140, a planner generates the function associated to demand and can therefore gain insight from it. For example, if the function is stochastic, the planner would realize that the part number would need to be managed more closely and rigorously. To illustrate the insights that may be gained, refer to FIG. 7. The top distribution function is a normal bell-curve 710. In such a distribution, one may calculate the reorder point and the safety stock 730 that should be kept on hand in inventory. However, if an inventory part is represented by a Poisson function 720, then the mean and variance the are same value, the reorder point is at a different location and the safety stock that should be kept on hand 740 is much greater.

The approach described here in step 140 may be less costly to apply than the brute force, back door approach of the prior art systems and the findings may be more accurate, which translates to cost savings for inventory management.

5. Calculating Target Stock Levels

As a final step shown in FIG. 1's general view of the invention, the target stock levels ("TSL") for the segments are calculated 150 based on the deployment algorithm. This step of the process may answer questions for deployment and replenishment. For example, for deployment, the TSLs may answer how much inventory is required to ensure an adequate level of service. For replenishment, the TSLs may answer when inventory should be order or moved, and by how much.

To calculate the TSLs at this step of the process, specific algorithm policies may be applied that may perform well over a wide range of demand values and types. Such policies are valuable because in the traditional planning approach to parts inventory management, a z-score is calculated for an area under the distribution curve. The shaded area (see FIG. 5) represents the demand that the planning meets while the unshaded portion represents the amount of inventory that will be stock-outs. Since current systems cannot calculate non-normal distributions readily or accurately, a z-score may not be accurate. The policies in this step offered by the present invention convert the probability distribution function into a planning language that is usable by planners. For example, the planner may plug in the monthly demand for a SKU in units as well as the variation in units to calculate an inventory plan for the part. The accuracy of the present invention may double the savings of inventory costs over the prior art.

Two such algorithms that may be used are (S−1,S) and (s,Q), where "S" stands for inventory level and the first parameter is the inventory level and the second parameter is the order quantity. In this case, (S−1, S) is a stocking model where the system will order one unit (S) when one unit is used and falls below the level of S. (S−1,S) is also called "issue one, replace one." This algorithm may perform well for low demand and sporadic demand parts, such as a satellite hub for telecomm networks and parts closets for a utility service. On the other hand, the (s,Q) policy may perform well for moderate demand and high volume demand parts where it is desirable that replenishment lot sizes may vary. For example, dealer parts inventory and plant maintenance stockrooms may make the (s,Q) appropriate. These two models explicitly account for demand variability, supply variability, and service requirements. The policies are easy to understand, easy to implement, and may be automated.

Figure 8:
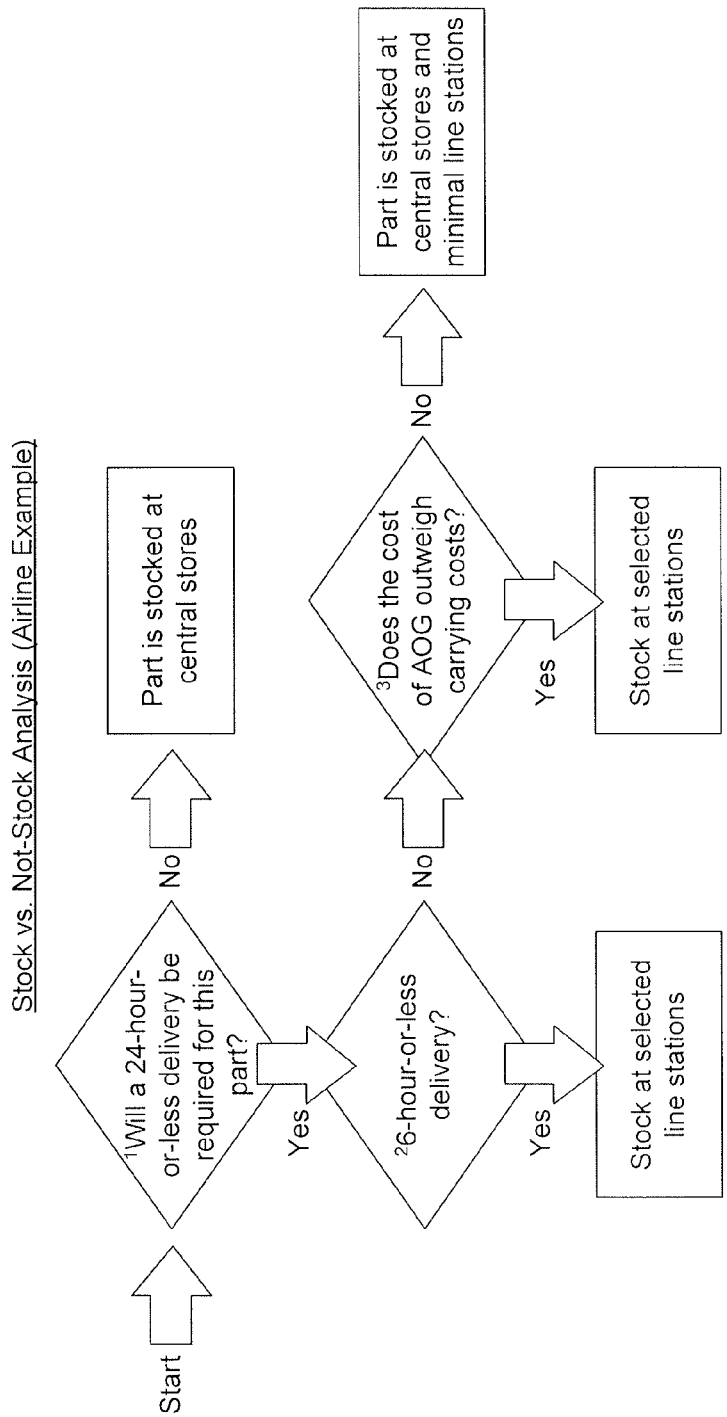
FIG. 8 illustrates a structured analysis for the stocking decision.

Once the TSLs are calculated using such models as (S−1,S) or (s,Q), a planner may also need to use a structured analysis to make a stocking decision (i.e., to stock or not to stock) for individual SKUs. FIG. 8 illustrates one example of a structured analysis for the stocking decision, based on an airplane company.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A method implemented using a computer for generating a sampling, comprising:
   determining a total population of an inventory of members;
   segmenting the total population into a plurality of segments;
   determining a sampling error for use in analyzing the plurality of segments;
   calculating, using the computer, a sample size for each of the plurality of segments based at least in part on the sampling error;
   using a criterion measure for ranking members of each of the plurality of segments;
   generating, using the computer, a set of random numbers for at least one of the plurality of segments, wherein the set is equal to the sample size for the at least one segment; and
   extracting, using the computer, from the at least one segment the members whose rankings match the set of random numbers.

2. The method of claim 1, wherein the segmenting is based on supplier lead time associated with a member of the inventory.

3. The method of claim 1, wherein the segmenting is based on supplier delivery performance associated with a member of the inventory.

4. The method of claim 1, wherein the segmenting is based on a cost associated with a member of the inventory.

5. The method of claim 1, wherein the plurality of segments represents a plurality of logistically distinct businesses.

6. The method of claim 5, wherein the plurality of logistically distinct businesses represents a plurality of different customer ordering profiles.

7. The method of claim 5, wherein the plurality of logistically distinct businesses represents a plurality of different supply chain flow patterns of members of the inventory.

8. The method of claim 1, wherein the criterion measure is based on a cost associated with a member of the inventory.

9. The method of claim 1, wherein the criterion measure is based on an item name associated with a member of the inventory.

10. The method of claim 1, wherein calculating a sample size for each of the plurality of segments is based on the formula:

$$n_x = N_x / 1 + N_x(e)^2$$

where $n_x$ represents the sample size, $N_x$ represents the number of members in the total population, and e represents the sampling error.

11. A computer-based system for generating a sampling, the system comprising at least one processor and at least one nontransitory storage medium that stores a plurality of instructions, the plurality of instructions being executable by the at least one processor for:
   determining a total population of an inventory of members;
   segmenting the total population into a plurality of segments;
   determining a sampling error for use in analyzing the plurality of segments;
   calculating a sample size for each of the plurality of segments based at least in part on the sampling error;
   using a criterion measure for ranking members of each of the plurality of segments;
   generating a set of random numbers for at least one of the plurality of segments, wherein the set is equal to the sample size for the at least one segment; and
   extracting from the at least one segment the members whose rankings match the set of random numbers.

12. The system of claim 11, wherein the segmenting is based on supplier lead time associated with a member of the inventory.

13. The system of claim 11, wherein the segmenting is based on supplier delivery performance associated with a member of the inventory.

14. The system of claim 11, wherein the segmenting is based on a cost associated with a member of the inventory.

15. The system of claim 11, wherein the plurality of segments represents a plurality of logistically distinct businesses.

16. The system of claim 15, wherein the plurality of logistically distinct businesses represents a plurality of different customer ordering profiles.

17. The system of claim 15, wherein the plurality of logistically distinct businesses represents a plurality of different supply chain flow patterns of members of the inventory.

18. The system of claim 11, wherein the criterion measure is based on a cost associated with a member of the inventory.

19. The system of claim 11, wherein the criterion measure is based on an item name associated with a member of the inventory.

20. The system of claim 11, wherein calculating a sample size for each of the plurality of segments is based on the formula:

$$n_x = N_x/1 + N_x(e)^2$$

where $n_x$ represents the sample size, $N_x$ represents the number of members in the total population, and e represents the sampling error.

* * * * *